E. C. Tuttle.

Making Hoes.

No 25,856.   Patented Oct. 18, 1859.

Witnesses:
E. Craig
R. Fitzgerald

Inventor:
Eben C. Tuttle

UNITED STATES PATENT OFFICE.

EBEN C. TUTTLE, OF NAUGATUCK, CONNECTICUT.

IMPROVEMENT IN MANUFACTURE OF HOES.

Specification forming part of Letters Patent No. 25,856, dated October 19, 1859.

*To all whom it may concern:*

Be it known that I, EBEN C. TUTTLE, of the town of Naugatuck, in the county of New Haven and State of Connecticut, have invented a new and useful Improvement in Hoes as a new Article of Manufacture; and I do hereby declare that the following is a full, clear, and exact description of the construction, character, and operation of the same, reference being had to the accompanying drawings, which make part of this specification, in which—

Figure 1:
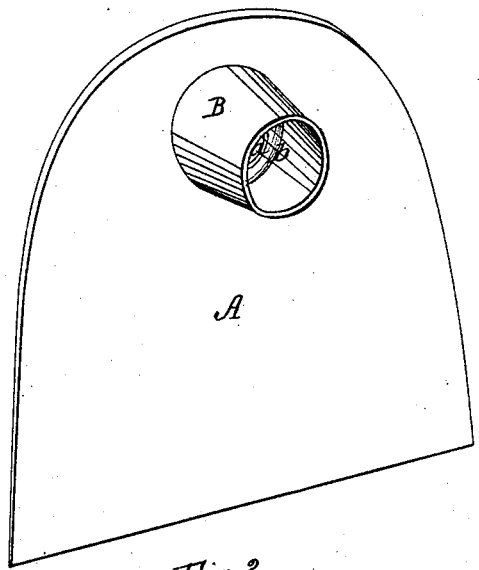
Figure 2:
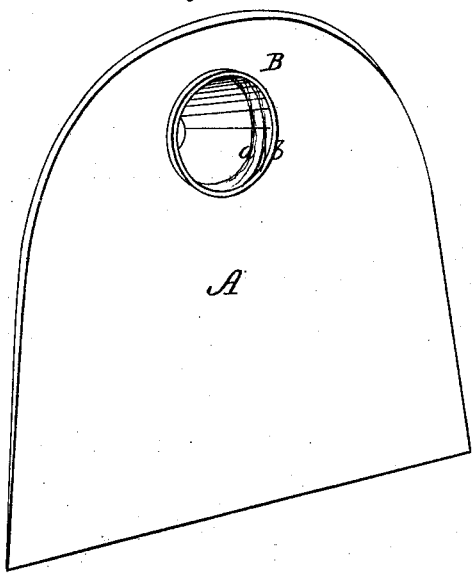

Figure 1 is a perspective view of the inner or front side of the hoe, showing how the eye is secured to the plate or blade. Fig. 2 is a perspective view of the outer or back side of the same, also showing the swells in the eye by which it is secured to the plate or blade. Fig. 3 is a plan of the plate or blade of the hoe without the eye. Fig. 4 is a perspective view of a section of the eye cut longitudinally through the center, showing a portion of the inner side of the swells. Fig. 5 is a plan of the same, showing the appearance of the swells when viewed directly across the eye.

My improvement consists in the manner of securing the eye in the plate or blade by means of two projecting swells or beads, one outside of the blade and the other inside, so as to confine the blade firmly between them, and thus secure the blade to the eye in the most permanent and substantial manner.

I make the blade or plate A of cast-steel, or any other suitable material, in the usual way, and in the form substantially shown in Figs. 1, 2, and 3. I make the eye B of iron tubing, properly tapered, substantially as shown in Figs. 1 and 2, and indicated in section in Figs. 4 and 5. I secure the eye B in the blade A by means of two projecting swells or beads, as shown at $a$ and $b$, Figs. 1 and 2, and indicated in section at $a$ and $b$ in Figs. 4 and 5, one swell, $a$, being outside of the blade, and the other, $b$, inside, as clearly shown in Figs. 1 and 2, the blade being between the projecting swells or beads, (shown in part at $a$ and $b$ in Figs. 4 and 5.) Thus the swells or beads secure the blade firmly to the eye. Both of the swells or beads are raised after the eye is inserted into the blade.

The advantages of my improvement consist in that I make a hoe, as a new article of manufacture, by fitting a circular or elliptic tube into a hole punched or otherwise made in a steel plate or blade without welding or riveting, but by simply raising two swells or beads in the piece of tubing which I use for the eye, so as to furnish the most valuable and durable hoe at the least possible expense for manufacturing.

What I claim as my invention, and desire to secure by Letters Patent, is—

The construction of a hoe, as a new article of manufacture, by securing the eye in the blade by two projecting swells or beads, $a$ and $b$, when constructed and fitted for use substantially as herein described.

EBEN C. TUTTLE.

Witnesses:
E. CRAIG,
R. FITZGERALD.